United States Patent
Ingley et al.

(10) Patent No.: US 11,391,180 B2
(45) Date of Patent: Jul. 19, 2022

(54) GAS TURBINE ENGINE INNER BARREL

(71) Applicant: ROLLS-ROYCE plc, London (GB)

(72) Inventors: Lucian Ingley, Derby (GB); Clare L. Bewick, Derby (GB)

(73) Assignee: ROLLS-ROYCE PLC, London (GB)

( * ) Notice: Subject to any disclaimer, the term of this patent is extended or adjusted under 35 U.S.C. 154(b) by 244 days.

(21) Appl. No.: 16/378,931

(22) Filed: Apr. 9, 2019

(65) Prior Publication Data

US 2019/0323383 A1    Oct. 24, 2019

(30) Foreign Application Priority Data

Apr. 23, 2018 (GB) ...................................... 1806564

(51) Int. Cl.
*F01D 25/26*    (2006.01)
*F02C 3/06*    (2006.01)

(52) U.S. Cl.
CPC ................ *F01D 25/26* (2013.01); *F02C 3/06* (2013.01); *F05D 2240/14* (2013.01)

(58) Field of Classification Search
CPC .......... F01D 25/14; F01D 25/24; F01D 25/26; F01D 25/28; F02C 3/06; F02C 3/073; F02C 7/00; F02C 7/057; F02C 7/12; F02C 7/14; F02C 7/16; F02C 7/18; F02C 7/36; F02K 3/04; F02K 3/06; F05D 2240/14
USPC ..................................................... 415/122.1
See application file for complete search history.

(56) References Cited

U.S. PATENT DOCUMENTS

| 4,442,987 | A | 4/1984 | Legrand et al. |
| 4,471,609 | A * | 9/1984 | Porter .......................... F02C 7/20 60/797 |
| 7,823,389 | B2 * | 11/2010 | Seitzer ..................... F01D 11/24 60/782 |
| 2002/0076320 | A1 | 6/2002 | Glover et al. |
| 2008/0072572 | A1 | 3/2008 | Beutin et al. |
| 2009/0129922 | A1 | 5/2009 | Cloft et al. |
| 2009/0189013 | A1 | 7/2009 | Hammer |

(Continued)

FOREIGN PATENT DOCUMENTS

| EP | 2982855 | 2/2016 |
| GB | 2266080 | 10/1993 |

OTHER PUBLICATIONS

EP search report dated Sep. 13, 2019, issued in EP Patent Application No. 19164854.

(Continued)

*Primary Examiner* — Woody A Lee, Jr.
*Assistant Examiner* — Justin A Pruitt
(74) *Attorney, Agent, or Firm* — Crowell & Moring LLP

(57) ABSTRACT

A gas turbine engine for an aircraft is provided. The gas turbine engine comprises an engine core comprising a compressor, a combustor, a turbine, and a core shaft connecting the turbine to the compressor. The gas turbine engine further comprises a fan located upstream of the engine core, the fan comprising a plurality of fan blades, the fan generating a core airflow which enters the engine core and a bypass airflow which flows through a bypass duct surrounding the engine core. The gas turbine engine further comprises a circumferential row of outer guide vanes located in the bypass duct rearwards of the fan, the outer guide vanes extending radially outwardly from an inner ring which defines a radially inner surface of the bypass duct.

11 Claims, 5 Drawing Sheets

(56) References Cited

U.S. PATENT DOCUMENTS

| | | |
|---|---|---|
| 2010/0008772 A1 | 1/2010 | Vauchel et al. |
| 2011/0094204 A1 | 4/2011 | Bouillon et al. |
| 2013/0084174 A1 | 4/2013 | Maalouf et al. |
| 2013/0195640 A1 | 8/2013 | Grede et al. |
| 2015/0143796 A1 | 5/2015 | Lacko |
| 2015/0159515 A1 | 6/2015 | Chiou et al. |
| 2015/0166193 A1 | 6/2015 | Beardsley et al. |
| 2015/0308291 A1 | 10/2015 | Brown |
| 2015/0377071 A1* | 12/2015 | Sawyers-Abbott ....... F02C 7/00 60/805 |
| 2016/0083102 A1 | 3/2016 | James et al. |
| 2017/0122128 A1 | 5/2017 | Lacko |
| 2017/0240288 A1 | 8/2017 | Pautis et al. |
| 2017/0327240 A1 | 11/2017 | Kerbler et al. |
| 2019/0055889 A1* | 2/2019 | Heims ...................... F02C 6/08 |
| 2019/0061966 A1 | 2/2019 | West |
| 2020/0141274 A1 | 5/2020 | Raya et al. |

OTHER PUBLICATIONS

EP search report dated Sep. 2, 2019, issued in EP Patent Application No. 19164855.
Notice of Allowance, dated Sep. 30, 2020, pp. 1-20, U.S. Appl. No. 16/378,847, United States Patent and Trademark Office, Alexandria, Virginia, United States of America.
Great Britain search report dated Oct. 22, 2018, issued in GB Patent Application No. 1806564.9.
Great Britain search report dated Oct. 23, 2018, issued in GB Patent Application No. 1806563.1.

* cited by examiner

GAS TURBINE ENGINE INNER BARREL

CROSS REFERENCE TO RELATED APPLICATIONS

This application is based upon and claims the benefit of priority from GB Patent Application No. GB 1806564.9, filed on 23 Apr. 2018, the entire contents of which are herein incorporated by reference.

BACKGROUND

Technical Field

The present disclosure relates to an inner barrel for a gas turbine engine, the inner barrel bridging an inner ring from which outer guide vanes extend across a bypass duct of the engine and an inner cowl which provides an aerodynamic fairing surrounding the engine core.

Description of the Related Art

In a turbofan gas turbine engine, a propulsive fan generates two airflows, one which passes through the core engine and one which passes through a surrounding bypass duct. Behind the fan in the bypass duct is a circumferential row of outer guide vanes which straighten out the bypass airflow from the fan. These vanes extend radially outwards from an inner ring which is a rigid structure defining a radially inner surface of the bypass duct.

Rearwardly of the plane of the outer guide vanes, the core engine is surrounded by an aerodynamic fairing called an inner cowl. This fairing also defines a radially inner surface of the bypass duct, and typically comprises door sections that can be opened to allow maintenance access to the core engine.

An interface structure if therefore needed to bridge the inner ring and the inner cowl. As the inner ring is typically the responsibility of the engine manufacturer, while the configuration of the inner cowl can be the responsibility of the airframer, this structure can take on additional importance.

SUMMARY

According to a first aspect there is provided a gas turbine engine for an aircraft comprising:

an engine core comprising a compressor, a combustor, a turbine, and a core shaft connecting the turbine to the compressor;

a fan located upstream of the engine core, the fan comprising a plurality of fan blades, the fan generating a core airflow which enters the engine core and a bypass airflow which flows through a bypass duct surrounding the engine core;

a circumferential row of outer guide vanes located in the bypass duct rearwards of the fan, the outer guide vanes extending radially outwardly from an inner ring which defines a radially inner surface of the bypass duct;

an inner cowl which provides an aerodynamic fairing surrounding the engine core, the inner cowl being rearwards of and axially spaced from the inner ring, and including one or more door sections which are openable to enable maintenance access to the engine core; and an inner barrel which surrounds the engine core and bridges the inner ring and the inner cowl, the inner barrel having a circumferentially extending rear edge which provides an engagement formation for engagement with the door sections when they are closed.

The inner barrel thus not only bridges the inner ring and the inner cowl, but also provides the engagement formation so that when the door sections are fully closed a smooth aeroline can be formed along the radially inner surface of the bypass duct.

Optional features of the present disclosure will now be set out. These are applicable singly or in any combination with any aspect of the present disclosure.

The inner barrel may be formed as a unitary structure with the inner ring. This can reduce the total weight of the engine and avoid a need for fasteners joining the inner barrel to the inner ring.

The inner barrel may have openings for transmission of services therethrough. For example, the services can include air diverted from the bypass airflow for use in turbine case cooling and/or compressed air bled from the compressor for use in aircraft.

The gas turbine engine may further comprise an electronic unit such as an electronic core data controller which controls the engine core and/or performs health monitoring of the engine core. Conveniently, the electronic unit can be mounted to the inner barrel.

The gas turbine engine may further comprise a surface cooler for cooling engine fluid using the bypass air flow. Conveniently, the surface cooler can be mounted to the inner barrel. For example, the surface cooler can be for cooling an integrated drive generator used to extract electrical power from the engine core.

The inner barrel may have one or more drainage apertures for allowing drainage of liquid from inside the engine barrel.

The inner barrel may have one or more ventilation holes for ventilating the engine core.

Conveniently, the engagement formation for engagement with the door sections when they are closed may be a circumferentially extending V-groove. The door sections can then have corresponding circumferentially extending features which engage with the V-groove when the doors are closed.

The rear edge of the inner barrel may be forward of the combustor.

An outer surface of the inner barrel typically defines a radially inner surface of the bypass duct. For example, this outer surface can be a surface of a main structural element (e.g. engine fire zone boundary) of the barrel, and/or it can be one or more in-fill panels located in outwardly facing recesses formed in the barrel, and/or it can be one or more fairings supported by a main structural element of the barrel.

It is possible for the inner barrel to be formed as a unitary piece. However, another option is for the inner barrel to be formed from plural separate barrel portions. In particular, the inner barrel may be formed as two half barrels located on respective opposite sides of the engine. The half barrels can be spaced apart at the top of the engine by a mounting pylon for mounting the engine to an airframe. For example, the mounting pylon can join to the engine core at a fixture located at top dead centre behind the inner ring.

Additionally or alternatively, when the inner barrel is formed as two half barrels on respective opposite sides of the engine, the inner cowl may have two door sections located on the respective opposite sides of the engine, each door section being pivotably openable about a respective pivot line which extends from front to back e.g. along a respective side of the above-mentioned mounting pylon. The two half barrels may then be spaced apart at the bottom of the engine by a keel beam which extends rearwardly from the inner ring at bottom dead centre thereof to provide latching formations rearward of the inner barrel for latching to lower edges of the door sections when they are closed.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$), The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
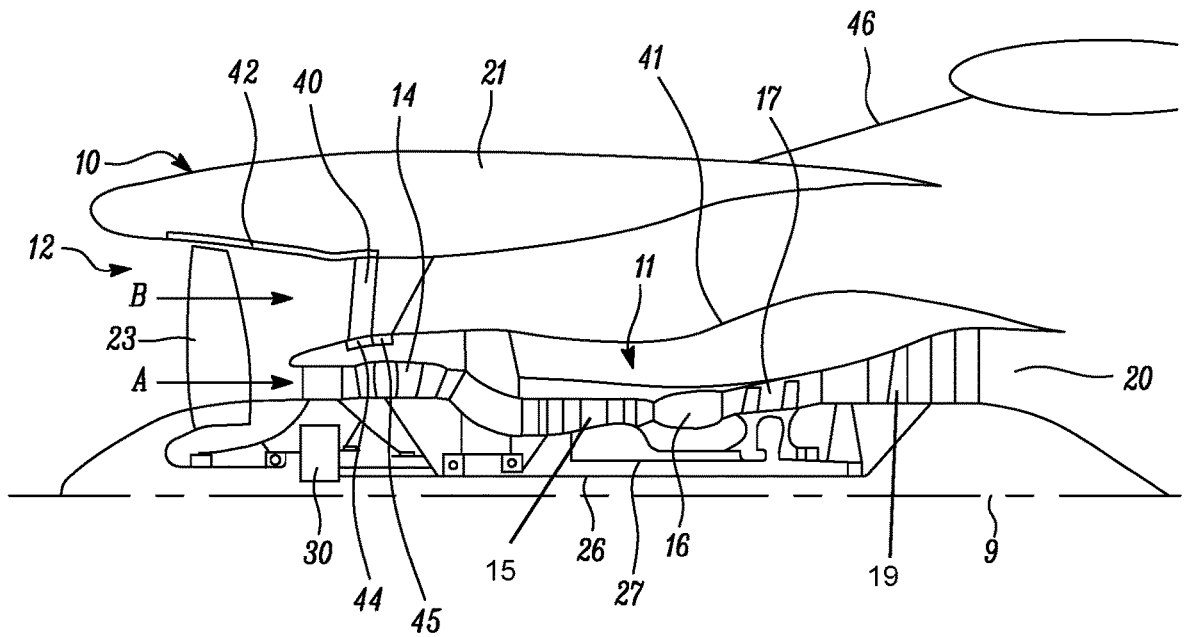
FIG. 1 is a sectional side view of a gas turbine engine.

FIG. 1 illustrates a gas turbine engine 10 having a principal rotational axis 9. The engine is mounted to an airframe, e.g. under a wing, by a mounting pylon 46. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The pylon 46 forms an upper bifurcation in the bypass duct where it traverses the duct to join to the engine core 11. The bypass airflow B flows through the bypass duct 22, where it is straightened by a row of outer guide vanes 40 before exiting the bypass exhaust nozzle 18. Rearward of the outer guide vanes 40, the engine core 10 is surrounded by an inner cowl 41 which provides an aerodynamic fairing defining an inner surface of the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
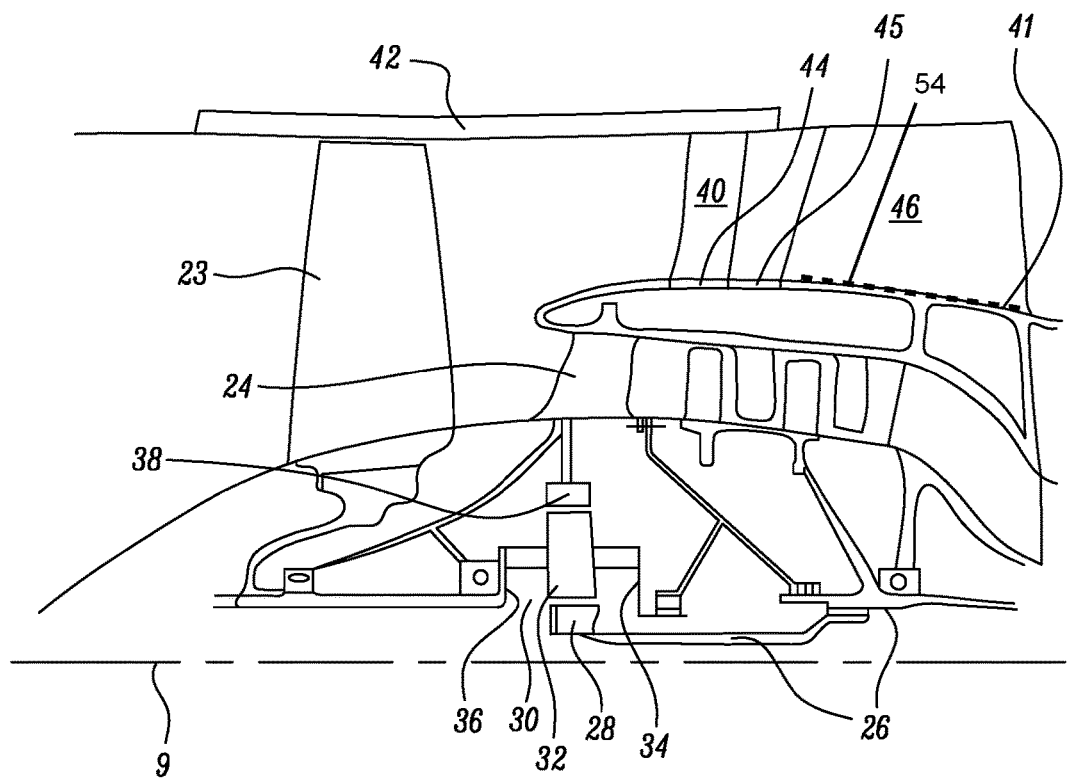
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
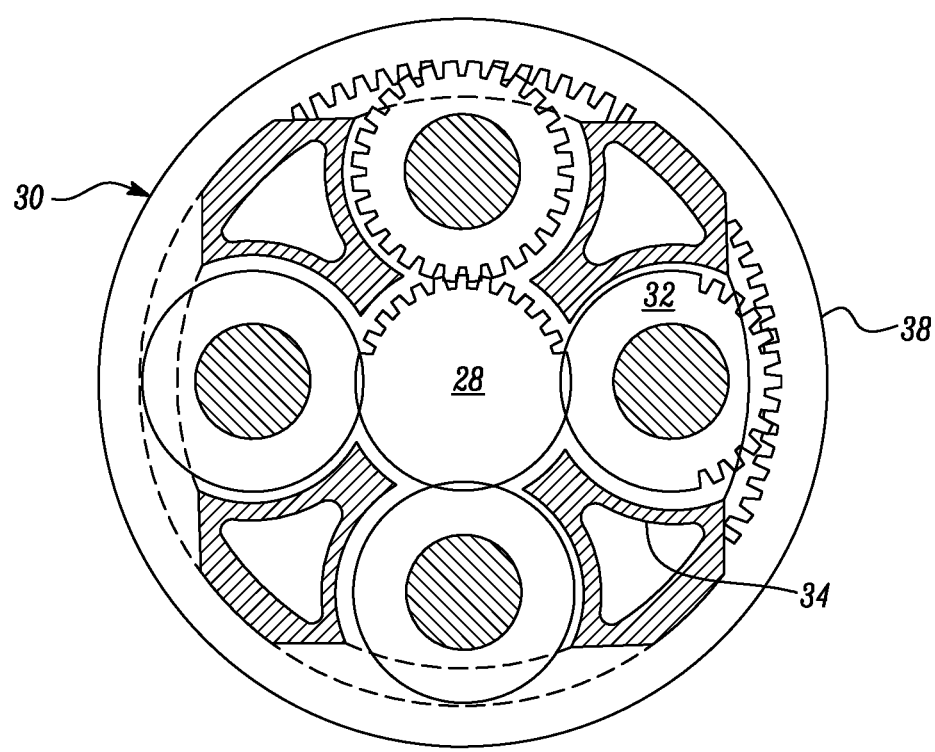
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
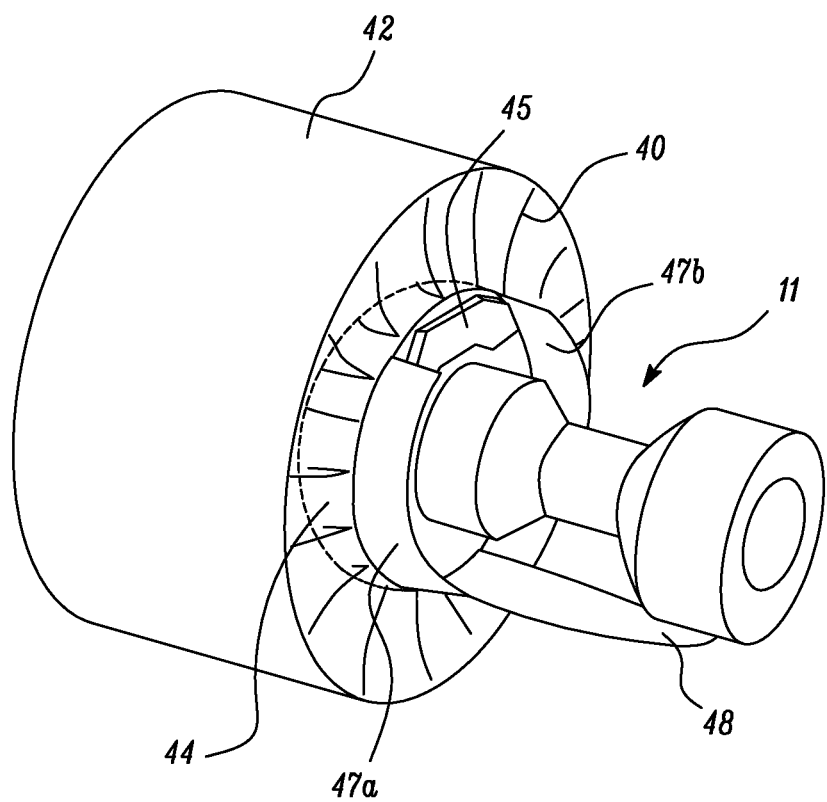
FIG. 4 shows schematically a perspective view from the rear of an engine without its nacelle and without its inner cowl.

FIG. 4 shows schematically a perspective view from the rear of the engine 10 with its nacelle 21, inner cowl 41 and pylon 46 removed. A fan case 42 defines an outer surface of the bypass duct 22 and towards the rear of the fan case an inner ring 44 defines an inner surface of the bypass duct 22. The outer guide vanes 40 extend radially from the inner ring to the fan case, and the engine core 11 projects rearwardly from the plane of the outer guide vanes. A fixture 45 located at top dead centre behind the inner ring provides a connection point for the mounting pylon 46 which mounts the engine to the airframe.

The inner cowl 41 can be formed as two door sections, one on either side of the engine 10, with each door section being pivotably openable about a respective pivot line 54 which extends from front to back along that door section's side of the pylon 46. This allows the door sections to be swung upwards and away from the engine core 11 for maintenance access. Conveniently, the top edges of the door sections can form the pivot lines. A keel beam 48 can also be provided, the keel beam extending rearwardly from bottom dead centre of the inner ring 44 to provide latching formations for latching to lower edges of the door sections when they are closed.

The inner cowl 41 is axially spaced from the inner ring 44. An inner barrel 47 bridges this space and provides a gas-washed fireproof structural panel with amalgamated fire sealing, drainage, and mechanical support interface features. The inner barrel 47 is in two halves 47a, 47b located on opposite sides of the engine. Each half barrel extends circumferentially on its side of the engine from the fixture 45 to the keel beam 48. In other variants, however, the inner barrel can be formed from more than two components, or can be formed as a single, continuous component (although in that case, the fixture 45 has to be moved or adapted to allow the barrel to continue through top dead centre, and/or the keel beam 48 has to be adapted or removed to allow the barrel to continue through bottom dead centre). Typically, the inner ring extends only a limited length in the axial direction, e.g. such that its rear edge is forward of the combustor of the engine core 11. This is consistent with providing an overall axially compact engine.

The inner barrel can provide some or all of the following functionalities:

(1) A zone compliant (fire and fluid) boundary between core and bypass zones of the engine.
(2) An interface to the inner cowl 41, such as circumferentially extending V-groove 49 for engagement, and hence position and load sharing, with the door sections of the inner cowl 41 when they are closed.
(3) An inner aeroline 51 of the bypass duct 22 along its axial station.
(4) Ventilation features for core zone ventilation.
(5) Drainage surfaces and apertures for core zone drainage.
(6) A fire zone compliant interface for turbine case cooling (TCC) air ingestion from the bypass duct 22.
(7) A fire zone compliant interface(s) for compressed air bleed exit from one of the compressors and optionally for other bleed air systems.
(8) Structural support and positioning features for mounting an electronic unit such as an electronic core data controller which controls the engine core 11 and/or performs health monitoring of the engine core.
(9) Structural support and positioning features for mounting a surface cooler for cooling engine fluid using the bypass air flow. For example, the cooled engine fluid can be used to cool an integrated drive generator for extracting electrical power from the engine core 11.
(10) Acoustic treatment for noise attenuation.

Figure 5:
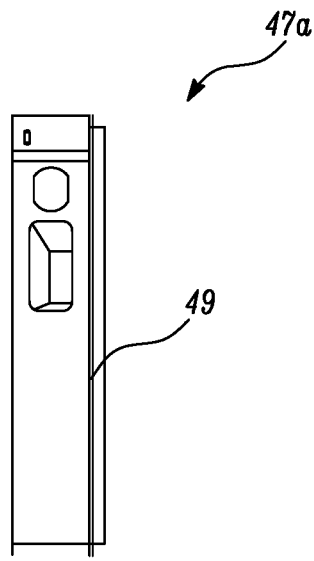
FIG. 5 shows a side view of a half barrel of an inner barrel of the engine of FIG. 4.
Figure 6:
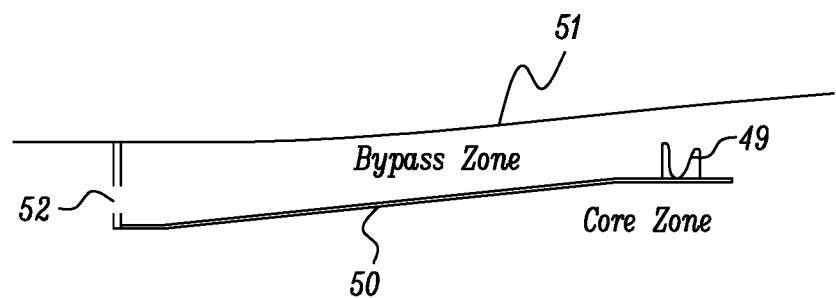
FIG. 6 shows a cross-section through the inner barrel of FIG. 5.
Figure 7:
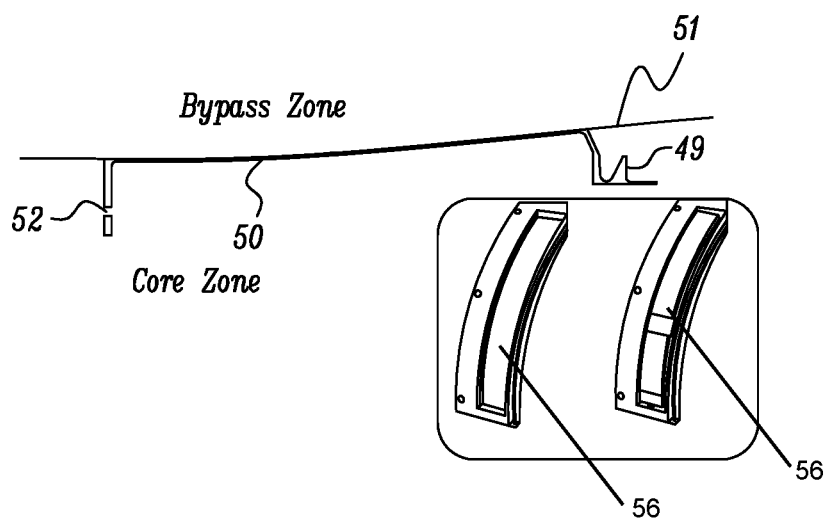
FIG. 7 shows a cross-section through a variant inner barrel.

FIG. 5 shows a side view of the half barrel 47a and illustrates features of the inner barrel providing some of these functionalities, such as the V-groove 49. FIG. 6 shows a cross-section through the inner barrel, with the core and bypass zones of the engine indicated on either side of the zone compliant boundary 50 provided by the barrel. The inner aero line 51 of the bypass duct 22 can then be provided by a fairing supported by the zone compliant boundary. However, FIG. 7 shows a cross-section through a variant inner barrel in which the zone compliant boundary 50 also forms the inner aeroline of the bypass duct. In this case, any bypass-side components mounted to the barrel can be located in local recesses 56 formed on that side of the barrel, as shown in the inset to FIG. 7.

Figure 8:
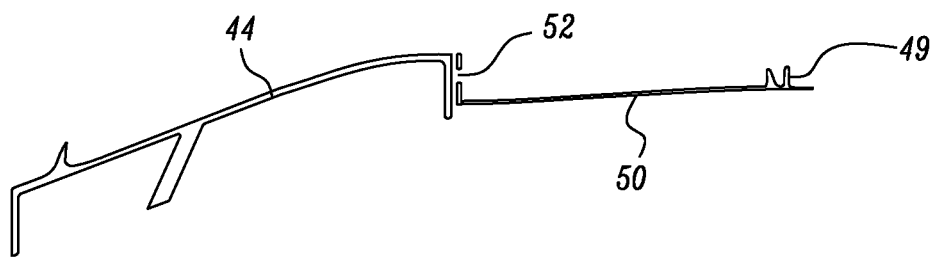
FIG. 8 shows at top the inner barrel of FIGS. 4 to 6 attached by fasteners to an inner ring of the engine, and at bottom a variant of the inner barrel formed as a unitary structure with the inner ring.
Figure 8:
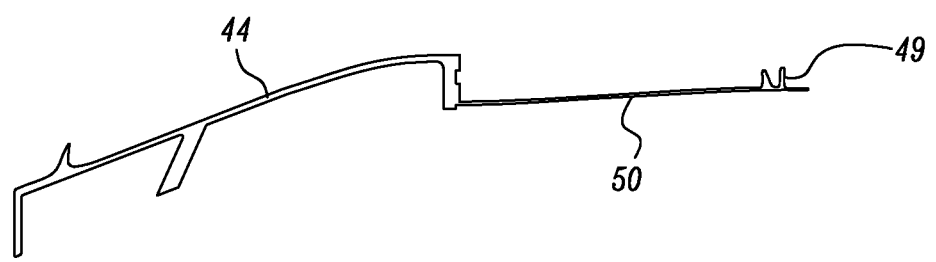

The forward edge of the inner barrel can have fastening features, such as a circumferential row of fastener (e.g. screw and/or bolt) holes 52 for fastening the barrel to the inner ring 44, as shown in the top cross-section of FIG. 8. However, another option, shown in the bottom cross-section of FIG. 8, is to form the inner barrel as a unitary structure with the inner ring, thereby reducing the total weight of the engine and avoiding a need for fasteners.

The zone compliant boundary 50 of the inner barrel can be fabricated from a metal sheet, which can then be forged to a ring providing the V-groove 49 and another ring providing a flange for the bolt holes 52. However, another option is to form at least the zone compliant boundary the barrel from composite material, e.g. by a laying up process.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft comprising:
an engine core comprising a compressor, a combustor, a turbine, and a core shaft connecting the turbine to the compressor;
a fan located upstream of the engine core, the fan comprising a plurality of fan blades, the fan generating a core airflow which enters the engine core and a bypass airflow which flows through a bypass duct surrounding the engine core;
a circumferential row of outer guide vanes located in the bypass duct rearwards of the fan, the outer guide vanes extending radially outwardly from an inner ring which defines a portion of a radially inner surface of the bypass duct;
an inner cowl which provides an aerodynamic fairing surrounding the engine core, the inner cowl being rearwards of and axially spaced from the inner ring; and
an inner barrel which surrounds the engine core and bridges the inner ring and the inner cowl, the inner barrel having a circumferentially extending rear edge which provides a circumferentially extending v-groove, wherein the inner barrel is formed as two half barrels spaced apart and located on respective opposite sides of the gas turbine engine, wherein the inner barrel comprises a local recess formed on a side of the inner barrel facing the bypass duct, wherein the local recess comprises a pair of sidewalls formed by a radially outer surface of the inner barrel, the sidewalls extending radially inward away from the bypass duct.

2. A gas turbine engine according to claim 1, wherein the inner barrel is formed as a unitary structure with the inner ring.

3. A gas turbine engine according to claim 1, wherein the rear edge of the inner barrel is forward of the combustor.

4. A gas turbine engine according to claim 1, wherein an outer surface of the inner barrel defines another portion of the radially inner surface of the bypass duct.

5. A gas turbine engine according to claim 1, wherein the half barrels are spaced apart at a top of the gas turbine engine by a mounting pylon for mounting the gas turbine engine to an airframe.

6. A gas turbine engine according to claim 5, wherein:
the two half barrels are spaced apart at a bottom of the gas turbine engine by a keel beam which extends rearwardly from the inner ring at bottom dead centre thereof.

7. A gas turbine engine according to claim 1, further comprising a gearbox that receives an input from the core shaft and outputs drive to the fan so as to drive the fan at a lower rotational speed than the core shaft.

8. The gas turbine engine according to claim 1, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

9. The gas turbine engine according to claim 1, wherein an axially extending surface of the inner barrel is disposed radially inward of an immediately adjacent portion of the inner ring upstream of the inner barrel.

10. A gas turbine engine for an aircraft comprising:
an engine core comprising a compressor, a combustor, a turbine, and a core shaft connecting the turbine to the compressor;
a fan located upstream of the engine core, the fan comprising a plurality of fan blades, the fan generating a core airflow which enters the engine core and a bypass airflow which flows through a bypass duct surrounding the engine core;
a circumferential row of outer guide vanes located in the bypass duct rearwards of the fan, the outer guide vanes extending radially outwardly from an inner ring which defines a portion of a radially inner surface of the bypass duct;
an inner cowl which provides an aerodynamic fairing surrounding the engine core, the inner cowl being rearwards of and axially spaced from the inner ring; and
an inner barrel which surrounds the engine core and bridges the inner ring and the inner cowl, the inner barrel having a circumferentially extending rear edge which provides a circumferentially extending v-groove, wherein the inner barrel is formed as two half barrels spaced apart and located on respective opposite sides of the gas turbine engine, wherein an axially extending surface of the inner barrel is disposed radially inward of an immediately adjacent portion of the inner ring upstream of the inner barrel, wherein the axially extending surface of the inner barrel is a radially outer surface of the inner barrel facing the bypass duct.

11. A gas turbine engine for an aircraft comprising:
an engine core comprising a compressor, a combustor, a turbine, and a core shaft connecting the turbine to the compressor;
a fan located upstream of the engine core, the fan comprising a plurality of fan blades, the fan generating a core airflow which enters the engine core and a bypass airflow which flows through a bypass duct surrounding the engine core;

a circumferential row of outer guide vanes located in the bypass duct rearwards of the fan, the outer guide vanes extending radially outwardly from an inner ring which defines a portion of a radially inner surface of the bypass duct;

an inner cowl which provides an aerodynamic fairing surrounding the engine core, the inner cowl being rearwards of and axially spaced from the inner ring; and an inner barrel which surrounds the engine core and bridges the inner ring and the inner cowl, the inner barrel having a circumferentially extending rear edge which provides a circumferentially extending v-groove, wherein the inner barrel is formed as two half barrels spaced apart and located on respective opposite sides of the gas turbine engine, wherein the inner barrel comprises a local recess formed on a side of the inner barrel facing the bypass duct, wherein the local recess does not extend across an entire circumference of the inner barrel.

* * * * *